(12) United States Patent
Worrell et al.

(10) Patent No.: US 6,237,944 B1
(45) Date of Patent: May 29, 2001

(54) MOUNTING MECHANISM FOR INFLATABLE RESTRAINT SYSTEM

(75) Inventors: Barry Christian Worrell, Centerville; Francis Joseph Holmes, Beavercreek, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/409,103

(22) Filed: Sep. 30, 1999

(51) Int. Cl.[7] ................................................. B60R 21/16
(52) U.S. Cl. ...................................... 280/731; 280/728.2
(58) Field of Search .............................. 280/728.2, 731, 280/728.1

(56) References Cited

U.S. PATENT DOCUMENTS

| | | | | |
|---|---|---|---|---|
| 3,905,643 | * | 9/1975 | Lamkemeyer | 297/212 |
| 5,207,544 | * | 5/1993 | Yamamoto et al. | 411/348 |
| 5,380,037 | | 1/1995 | Worrell et al. . | |
| 5,409,256 | * | 4/1995 | Gordon et al. | 280/728.2 |
| 5,508,481 | * | 4/1996 | Williams et al. | 200/61.54 |
| 5,560,642 | * | 10/1996 | Davidson et al. | 280/728.2 |
| 5,577,768 | * | 11/1996 | Taguchi et al. | 280/735 |
| 5,584,501 | * | 12/1996 | Walters et al. | 280/728.2 |
| 5,620,201 | * | 4/1997 | Ricks | 280/728.2 |
| 5,624,130 | * | 4/1997 | Ricks | 280/728.2 |
| 5,775,725 | * | 7/1998 | Hodac et al. | 280/728.2 |
| 5,788,268 | * | 8/1998 | Goss et al. | 280/728.2 |
| 5,797,622 | * | 8/1998 | Turner et al. | 280/731 |
| 6,036,223 | * | 3/2000 | Worrell et al. | 280/731 |
| 6,082,758 | * | 7/2000 | Schenck | 280/728.2 |
| 6,086,090 | * | 7/2000 | Fischer | 280/728.2 |
| 6,092,832 | * | 7/2000 | Worrell et al. | 280/728.2 |

* cited by examiner

Primary Examiner—Paul N. Dickson
Assistant Examiner—Deanna Draper
(74) Attorney, Agent, or Firm—Kathryn A. Marra

(57) ABSTRACT

A mounting mechanism for an inflatable restraint system includes a spring housing having a spring cavity and a plurality of first apertures extending therethrough. The spring housing is adapted to be disposed adjacent and connected to a support structure and aligned with a plurality of second apertures extending through the support structure. The mounting mechanism also includes a spring disposed in the spring cavity and extending across the first apertures and adapted to retain a plurality of mounting members of an inflatable restraint module extending through the first apertures and the second apertures to the support structure. The spring includes at least one torsion coil to reduce a bending moment of the spring when deflected by the mounting members of the inflatable restraint module.

19 Claims, 3 Drawing Sheets

MOUNTING MECHANISM FOR INFLATABLE RESTRAINT SYSTEM

TECHNICAL FIELD

The present invention relates generally to inflatable restraint systems for vehicles and, more particularly, to a mounting mechanism for an inflatable restraint system of a vehicle.

BACKGROUND OF THE INVENTION

It is known to provide an inflatable restraint system in a vehicle to augment protection traditionally afforded vehicle occupants through the use of seat belt restraints. In some vehicles, the inflatable restraint system may be an air bag system disposed within an occupant compartment in the vehicle in close proximity to either a driver occupant or one or more passenger occupants. Typically, the air bag system includes an air bag module attached to vehicle structure such as a steering wheel and having an air bag for deployment through an opening in a cover to extend in the occupant compartment of the vehicle. The deployed air bag restrains movement of the occupant to help protect the occupant during a collision.

Various mounting mechanisms have been used for securing the inflatable restraint module to a support structure in a vehicle, such as a steering wheel or dashboard. In one known mounting mechanism, mounting bolts are provided passing from a rear of the support structure and threadably engaging nuts mounted on the inflatable restraint module. In another known mounting mechanism for a vehicle steering wheel, sleeve members mounted to the inflatable restraint module and surrounding the mounting bolts may be forced into contact with a plate forming the supporting structure on a hub portion of the steering wheel to complete a circuit for actuating a horn.

An example of a mounting mechanism for an inflatable restraint module is disclosed in U.S. Pat. No. 5,380,037 to Worrell et al. In this patent, a mounting mechanism is used in mounting an inflatable restraint module to a support structure such as a hub portion of a steering wheel. The steering wheel has a support plate attached to the hub portion and opposing front and rear faces with a plurality of apertures therethrough. The inflatable restraint module has a plurality of mounting members that are adapted to pass through and be retained within the apertures in the support plate. Each of the mounting members is individually cold-formed and broached into a solid, round steel pin having a head portion and an opposing distal end. Each of the head portions of the mounting members, typically four, must be separately pressed or welded onto a metal base plate. Each of the mounting members includes a slot for receiving a spring that traverses across the apertures of the support plate. The spring is a flat wire spring. Due to the limited bending moment available, this flat wire spring has a high bending moment, resulting in increased insertion efforts required to assemble the air bag module, e.g., approximately eighty newtons (80 n), to the support plate of the steering wheel.

As a result, it is desirable to provide a mounting mechanism for an inflatable restraint system having reduced or lower insertion effort of an inflatable restraint module to a steering wheel. It is also desirable to provide a mounting mechanism for an inflatable restraint system with a snap-on design and improved durability.

SUMMARY OF THE INVENTION

It is, therefore, one object of the present invention to provide a mounting mechanism for an inflatable restraint system of a vehicle.

It is another object of the present invention to provide a mounting mechanism for an inflatable restraint system having a low insertion effort.

To achieve the foregoing objects, the present invention is a mounting mechanism for an inflatable restraint system including a spring housing having a spring cavity and a plurality of first apertures extending therethrough. The spring housing is adapted to be disposed adjacent and connected to a support structure and aligned with a plurality of second apertures extending through the support structure. The mounting mechanism also includes a spring disposed in the spring cavity and extending across the first apertures and adapted to retain a plurality of mounting members of an inflatable restraint module extending through the first apertures and the second apertures to the support structure. The spring includes at least one torsion coil to reduce a bending moment of the spring when deflected by the mounting members of the inflatable restraint module.

One advantage of the present invention is that an improved mounting mechanism is provided for an inflatable restraint system. Another advantage of the present invention is that the mounting mechanism provides a torsion spring having a reduced or low insertion effort for attaching an inflatable restraint module to a support structure. Yet another advantage of the present invention is that the mounting mechanism has improved durability such that the spring will not yield in a working envelope. Still another advantage of the present invention is that the mounting mechanism has a snap-on design.

Other objects, features and advantages of the present invention will be readily appreciated, as the same becomes better understood after reading the subsequent description taken in conjunction with the accompanying drawings.

DESCRIPTION OF THE PREFERRED EMBODIMENT

Figure 1:
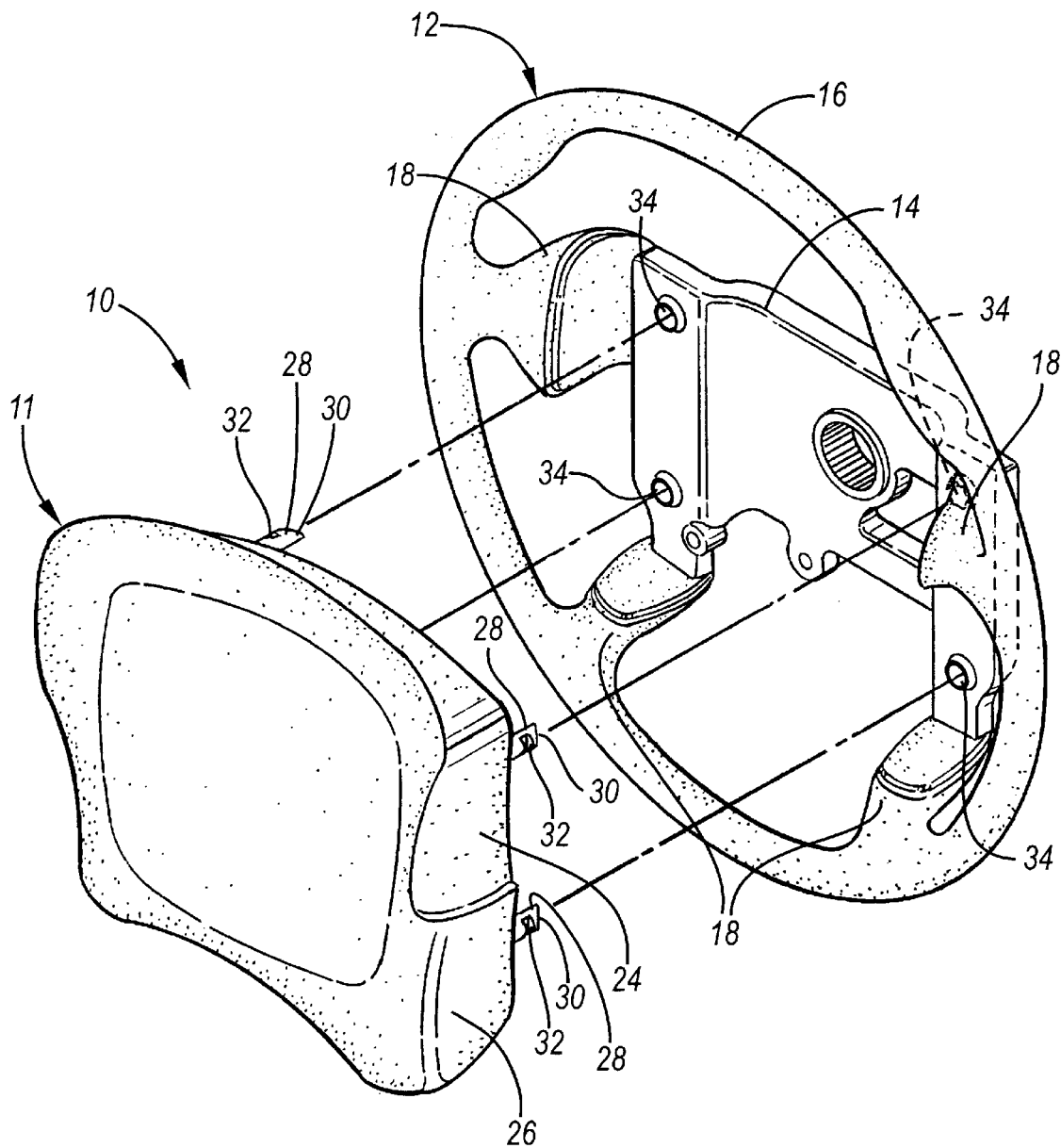
FIG. 1 is an exploded perspective view of an inflatable restraint system, according to the present invention.
Figure 2:
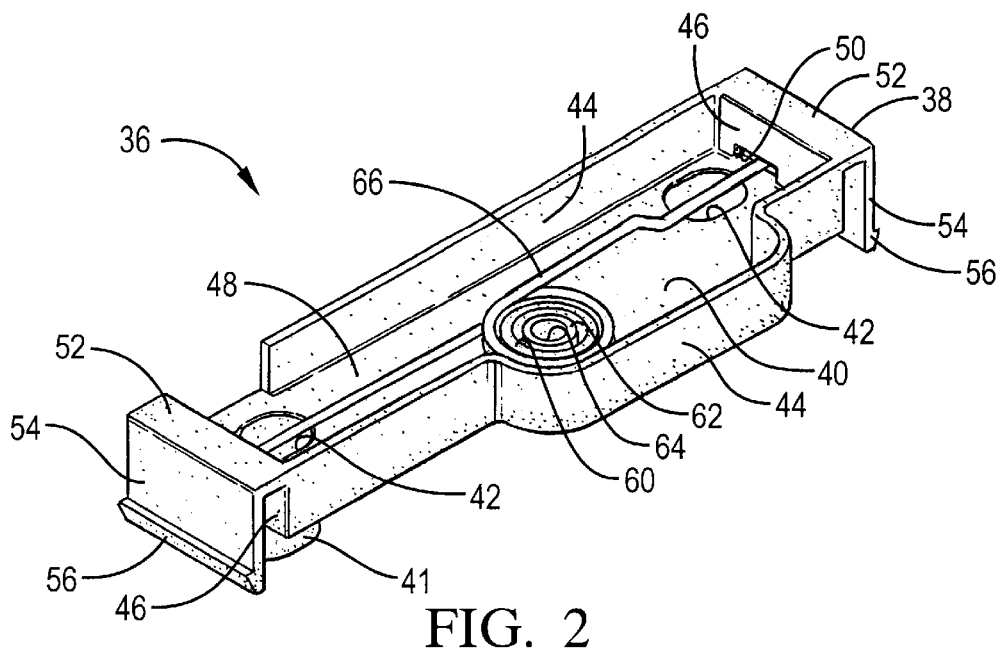
FIG. 2 is a perspective view of a mounting mechanism, according to the present invention, to attach an inflatable restraint module to a steering wheel of the inflatable restraint system of FIG. 1.
Figure 3:
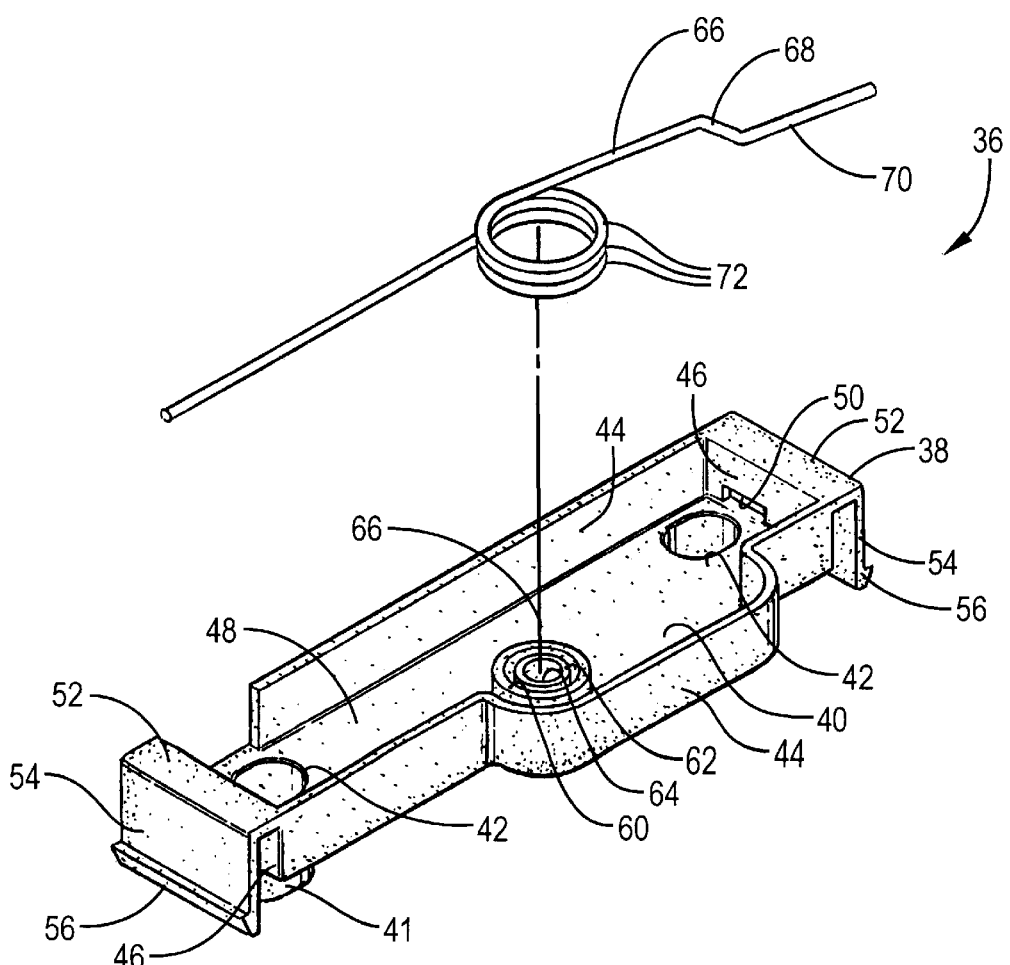
FIG. 3 is an exploded perspective view of the mounting mechanism of FIG. 2.
Figure 4:
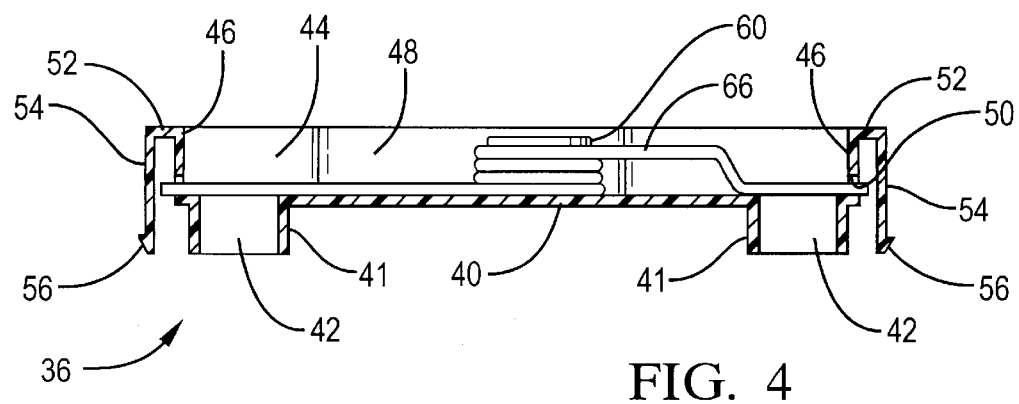
FIG. 4 is a fragmentary elevational view of the mounting mechanism of FIG. 2.
Figure 5:
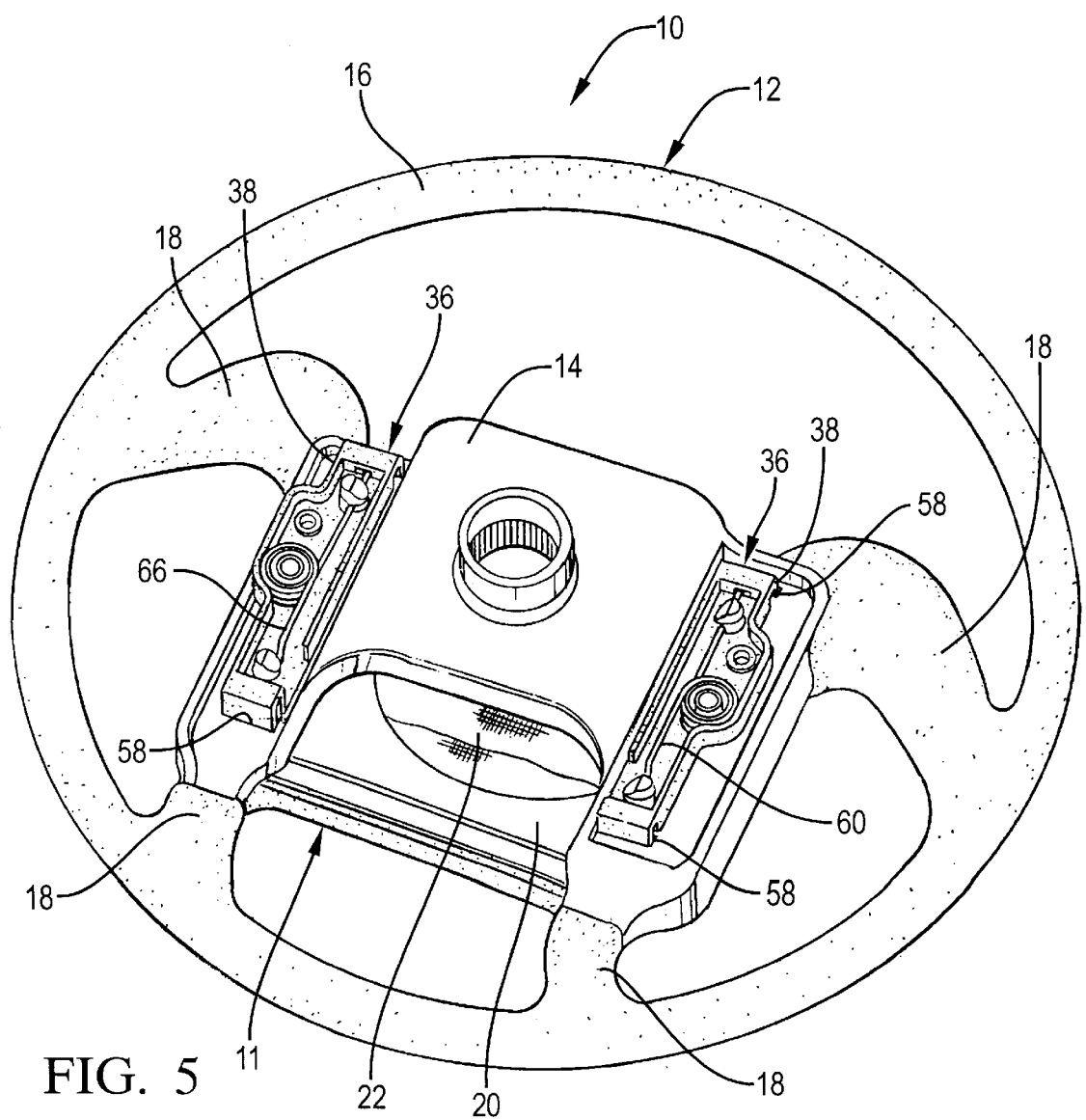
FIG. 5 is a perspective view of the inflatable restraint module attached to the steering wheel of the inflatable restraint system of FIG. 1 by the mounting mechanism of FIG. 2.

Referring to the drawings and in particular FIGS. 1 and 5, one embodiment of an inflatable restraint system 10, according to the present invention, is shown for a vehicle (not shown). The inflatable restraint system 10 includes an inflatable restraint module, generally indicated at 11, and a support structure such as steering wheel, generally indicated at 12, of the vehicle. The steering wheel 12 includes a central hub or support plate 14, a rim 16 encircling the support plate 14, and at least one, preferably a plurality of spokes 18 interconnecting the rim 16 and support plate 14. It should be appreciated that the support plate 14 is attached to a steering shaft (not shown) of the vehicle in a conventional manner.

The inflatable restraint module 11 includes a base plate 20 for mounting an inflatable restraint such as an air bag and inflator, generally indicated at 22. The inflatable restraint and inflator 22 are encapsulated in a container 24 that is covered by an outer soft cover or pad 26. The container 24 is bolted to the base plate 20 by fasteners (not shown) to form the assembled inflatable restraint module 11. The inflatable restraint module 11 also includes a plurality of elongated cylindrical pins or mounting members 28 rigidly mounted to the base plate 20 and extending therefrom toward the support plate 14. In the embodiment illustrated, four such mounting members 28 are provided attached to the base plate 20. Each of the mounting members 28 has a generally round or circular cross-sectional shape. Each of the mounting members 28 includes a tapered end 30 and a slot 32 which is elongated in a direction generally perpendicular to a longitudinal axis of the mounting member 28. The support plate 14 is formed with a plurality of apertures 34 corresponding in number and location to the number and location of the mounting members 28, whereby the apertures 34 are disposed to receive the tapered ends 30 of the mounting members 28.

Referring to FIGS. 2 through 5, a mounting mechanism, according to the present invention and generally indicated at 36, attaches the inflatable restraint module 11 to the support plate 14 of the steering wheel 12. The mounting mechanism 36 includes at least one, preferably a plurality of spring housings 38 disposed adjacent a rear face of the support plate 14 of the steering wheel 12. Each spring housing 38 has a generally planar base wall 40 extending longitudinally. The base wall 40 is generally rectangular in shape. The base wall 40 has at least one, preferably a plurality of projections 41 extending generally perpendicular thereto to form apertures 42 extending therethrough to receive the mounting members 28 of the inflatable restraint module 10. The projections 41 are generally circular in cross-sectional shape. The projections 41 and apertures 42 correspond in number and location to the number and location of the mounting members 28, whereby the apertures 42 are disposed to receive the tapered ends 30 of the mounting members 28. Preferably, each spring housing 38 includes two projections 41 and apertures 42.

The spring housing 38 also has a pair of side walls 44 and end walls 46 extending substantially around a periphery of the base wall 40 to form a spring cavity 48. The side walls 44 and end walls 46 are generally perpendicular to the base wall 40 and generally rectangular in shape. One of the side walls 44 has an aperture 50 extending therethrough for a function to be described. The spring housing 38 has a top wall 52 extending outwardly from each end wall 46. The top wall 52 is generally planar and rectangular in shape. The spring housing 38 also has a leg wall 54 extending generally perpendicularly from each top wall 52 and downwardly past the base wall 40. The leg wall 54 is generally planar and rectangular in shape. Each leg wall 54 has a flange 56 extending outwardly at an angle. Each leg wall 54 extends through a corresponding aperture 58 in the support plate 14 such that the flange 56 engages a front face of the support plate 14 to hold the spring housing 38 in position on the support plate 14.

The spring housing 38 further includes a spring boss 60 extending generally perpendicularly from the base wall 40 into the spring cavity 48 for a function to be described. The spring boss 60 is generally cylindrical and circular in cross-sectional shape. In the embodiment illustrated, the spring boss 60 is generally hollow, but may be formed solid. The spring boss 60 may include a projection 62 extending from the base wall 40 and have a cavity 64 therein. The spring housing 38 is made of a rigid insulating material such as plastic and is formed as a monolithic structure being integral, unitary and one-piece.

The mounting mechanism 36 also includes a spring 66, according to the present invention, disposed in the spring cavity 48 of each spring housing 38. The spring 66 extends between and across the pair of apertures 42 of the spring housing 38 in order to ensure that the spring 66 contacts the mounting members 28 as the inflatable restraint module 11 is moved into association with the support plate 14. The spring 66 includes a kink portion 68 extending at an angle to a longitudinal axis thereof and a leg portion 70 extending longitudinally from the kink portion 68 and through the aperture 50 of the end wall 46. The spring 66 includes at least one, preferably a plurality of torsion coils 72 located between the apertures 42 and disposed about the spring boss 60. The torsion coils 72 are generally circular in shape to form a helical stack. The bending moment or insertion effort of the spring 66 can be adjusted by adding or reducing the number of torsion coils 72. The spring 66 is of a torsion type and made of a resilient material such as a round wire. The spring 66 is resiliently yieldable in a lateral direction, transverse to the longitudinal axis of the mounting members 28, to permit insertion of the mounting members 28 through the apertures 42 and past the springs 66, which movement is facilitated by the configuration of the tapered ends 30. The spring 66 is pre-assembled in and tightly engaged against the spring housing 38 and is biased to assure robust performance. It should be appreciated that the addition of the torsion coils 72 near a middle of the spring 66 reduces the bending moment of the spring 66. It should also be appreciated that the spring 66 is formed as a monolithic structure being integral, unitary and one-piece. It should further be appreciated that, except for the mounting mechanism 36, the inflatable restraint module 11 and steering wheel 12 are similar to that disclosed in U.S. Pat. No. 5,380,037 to Worrell et al., the disclosure of which is hereby incorporated by reference.

In operation of the inflatable restraint system 10, the mounting members 28 of the inflatable restraint module 11 are moved in a first direction toward the front face of the support plate 14 and through the apertures 34. The springs 66 move laterally outwardly until they are aligned with the slots 32, at which time the springs 66 will move laterally inwardly into contact with the slots 32. In this position, the springs 66 prevent the mounting members 28 from moving in a second direction out of the apertures 34, whereby the inflatable restraint module 11 is held in operative relationship to the support plate 14. It should be appreciated that the torsion coils 72 serve to reduce the force required to deflect the spring 66 during assembly of the inflatable restraint module 11 to the steering wheel 12 and also reduces the stresses on the spring 66 during deflection.

If it is desired to separate the inflatable restraint module 11 from the support plate 14, a tool (not shown) such as a screwdriver may be inserted through apertures (not shown) provided in a rear portion of the steering wheel 12, wherein a blade of the screwdriver is received within spaces provided in the spring housings 38 and the screwdriver is rotated. Rotation of the screwdriver blade located within the spaces causes the blade to contact an end of the spring 66 and a wall opposite the spring 66 to thereby urge the spring 66 laterally outwardly and out of engagement with the slot 30. In this manner, the mounting members 28 are released to move out of engagement with the support plate 14.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A mounting mechanism for an inflatable restraint system comprising:

a spring housing having a spring cavity and a plurality of first apertures extending therethrough and spaced from each other, said spring housing being adapted to be disposed adjacent and connected to a support structure and aligned with a plurality of second apertures extending through the support structure; and a spring disposed in said spring cavity and extending across said first apertures and adapted to retain a plurality of mounting members of an inflatable restraint module extending through said first apertures and the second apertures to the support structure, said spring including at least one torsion coil disposed between said first apertures to reduce a bending moment of said spring when deflected by the mounting members of the inflatable restraint module.

2. A mounting mechanism as set forth in claim 1 wherein said spring extends longitudinally and said at least one torsion coil is disposed between ends of said spring.

3. A mounting mechanism as set forth in claim 1 wherein said spring includes a kink portion extending at an angle to a longitudinal axis of said spring and a leg portion extending longitudinally from said kink portion.

4. A mounting mechanism as set forth in claim 1 wherein said spring is made of a round wire.

5. A mounting mechanism as set forth in claim 1 wherein said spring housing has a base wall and at least a pair of said first apertures extending therethrough adapted to receive the mounting members, said spring extending between and across said first apertures.

6. A mounting mechanism as set forth in claim 5 wherein said spring housing has a spring boss extending from said base wall and located between said first apertures.

7. A mounting mechanism as set forth in claim 6 wherein said spring boss is generally cylindrical in shape.

8. A mounting mechanism as set forth in claim 5 wherein said spring housing has opposed side walls and end walls extending generally perpendicular from sides and ends of said base wall to form said spring cavity.

9. A mounting mechanism for an inflatable restraint system comprising:

a spring housing having a spring cavity and a plurality of first apertures extending therethrough, said spring housing being adapted to be disposed adjacent and connected to a support structure and aligned with a plurality of second apertures extending through the support structure;

a spring disposed in said spring cavity and extending across said first apertures and adapted to retain a plurality of mounting members of an inflatable restraint module extending through said first apertures and the second apertures to the support structure, said spring including at least one torsion coil to reduce a bending moment of said spring when deflected by the mounting members of the inflatable restraint module;

wherein said spring housing has a base wall and at least a pair of said first apertures extending therethrough adapted to receive the mounting members, said spring extending between and across said first apertures;

wherein said spring housing has opposed side walls and end walls extending generally perpendicular from sides and ends of said base wall to form said spring cavity; and wherein one of said end walls includes an aperture extending therethrough to receive one end of said spring.

10. A mounting mechanism for an inflatable restraint system comprising:

a spring housing having a spring cavity and a plurality of first apertures extending therethrough, said spring housing being adapted to be disposed adjacent and connected to a support structure and aligned with a plurality of second apertures extending through the support structure;

a spring disposed in said spring cavity and extending across said first apertures and adapted to retain a plurality of mounting members of an inflatable restraint module extending through said first apertures and the second apertures to the support structure, said spring including at least one torsion coil to reduce a bending moment of said spring when deflected by the mounting members of the inflatable restraint module;

wherein said spring housing has a base wall and at least a pair of said first apertures extending therethrough adapted to receive the mounting members, said spring extending between and across said first apertures;

wherein said spring housing has opposed side walls and end walls extending generally perpendicular from sides and ends of said base wall to form said spring cavity; and wherein said spring housing includes a top wall extending longitudinally and generally perpendicular from each of said end walls.

11. A mounting mechanism for an inflatable restraint system comprising:

a spring housing having a spring cavity and a plurality of first apertures extending therethrough, said spring housing being adapted to be disposed adjacent and connected to a support structure and aligned with a plurality of second apertures extending through the support structure;

a spring disposed in said spring cavity and extending across said first apertures and adapted to retain a plurality of mounting members of an inflatable restraint module extending through said first apertures and the second apertures to the support structure, said spring including at least one torsion coil to reduce a bending moment of said spring when deflected by the mounting members of the inflatable restraint module;

wherein said spring housing has a base wall and at least a pair of said first apertures extending therethrough adapted to receive the mounting members, said spring extending between and across said first apertures; and wherein said spring housing includes a leg wall extending downwardly from said top wall and a flange extending outwardly from said leg wall.

12. An inflatable restraint system for a vehicle comprising:

a steering wheel having a support plate with at least one pair of apertures extending therethrough;

an inflatable restraint module having at least one pair of mounting members extending through said at least one pair of apertures; and at least one mounting mechanism to receive said at least one pair of mounting members and attach said inflatable restraint module to said steering wheel, said at least one mounting mechanism comprising a spring housing having a spring cavity and a plurality of first apertures extending therethrough and spaced from each other and a spring boss disposed between said first apertures and extending into said spring cavity, and a spring disposed in said spring cavity and extending across said first apertures to retain said mounting members extending through said first apertures and said second apertures, said spring including at least one torsion coil disposed about said spring boss to reduce a bending moment of said spring when deflected by said mounting members.

13. An inflatable restraint system as set forth in claim 12 wherein said spring extends longitudinally and said at least one torsion coil is disposed between ends of said spring.

14. An inflatable restraint system as set forth in claim 12 wherein said spring includes a kink portion extending at an angle to a longitudinal axis of said spring and a leg portion extending longitudinally from said kink portion.

15. An inflatable restraint system as set forth in claim 12 wherein said spring is made of a round wire.

16. An inflatable restraint system as set forth in claim 12 wherein said spring housing has a base wall and at least a pair of said first apertures extending therethrough adapted to receive said mounting members, said spring extending between and across said first apertures.

17. An inflatable restraint system as set forth in claim 12 wherein said spring housing has opposed side walls and end walls extending generally perpendicular from sides and ends of said base wall to form said spring cavity.

18. An inflatable restraint system for a vehicle comprising:

- a steering wheel having a support plate with at least one pair of apertures extending therethrough;
- an inflatable restraint module having at least one pair of mounting members extending through said at least one pair of apertures;
- at least one mounting mechanism to receive said at least one pair of mounting members and attach said inflatable restraint module to said steering wheel, said at least one mounting mechanism comprising a spring housing having a spring cavity and a plurality of first apertures extending therethrough, and a spring disposed in said spring cavity and extending across said first apertures to retain said mounting members extending through said first apertures and said second apertures, said spring including at least one torsion coil to reduce a bending moment of said spring when deflected by said mounting members;
- wherein said spring housing has a base wall and at least a pair of said first apertures extending therethrough to receive said mounting members, said spring extending between and across said first apertures;
- wherein said spring housing has opposed side walls and end walls extending generally perpendicular from sides and ends of said base wall to form said spring cavity; and
- wherein one of said end walls includes an aperture extending therethrough to receive one end of said spring.

19. An inflatable restraint system for a vehicle comprising:

- a steering wheel having a support plate with at least one pair of apertures extending therethrough;
- an inflatable restraint module having at least one pair of mounting members extending through said at least one pair of apertures; and
- at least one mounting mechanism to receive said at least one pair of mounting members and attach said inflatable restraint module to said steering wheel, said at least one mounting mechanism comprising a spring housing having a spring cavity and a plurality of first apertures extending therethrough and spaced from each other and a spring boss disposed between said first apertures and extending into said spring cavity, and a spring disposed in said spring cavity and extending across said first apertures to retain said mounting members extending through said first apertures and said second apertures, said spring comprising a round wire extending longitudinally including a plurality of torsion coils disposed between ends of said spring and about said spring boss to reduce a bending moment of said spring when deflected by said mounting members.

\* \* \* \* \*